(No Model.)
J. F. CARNAGY.
SULKY OR WHEEL PLOW.
No. 244,852. Patented July 26, 1881.
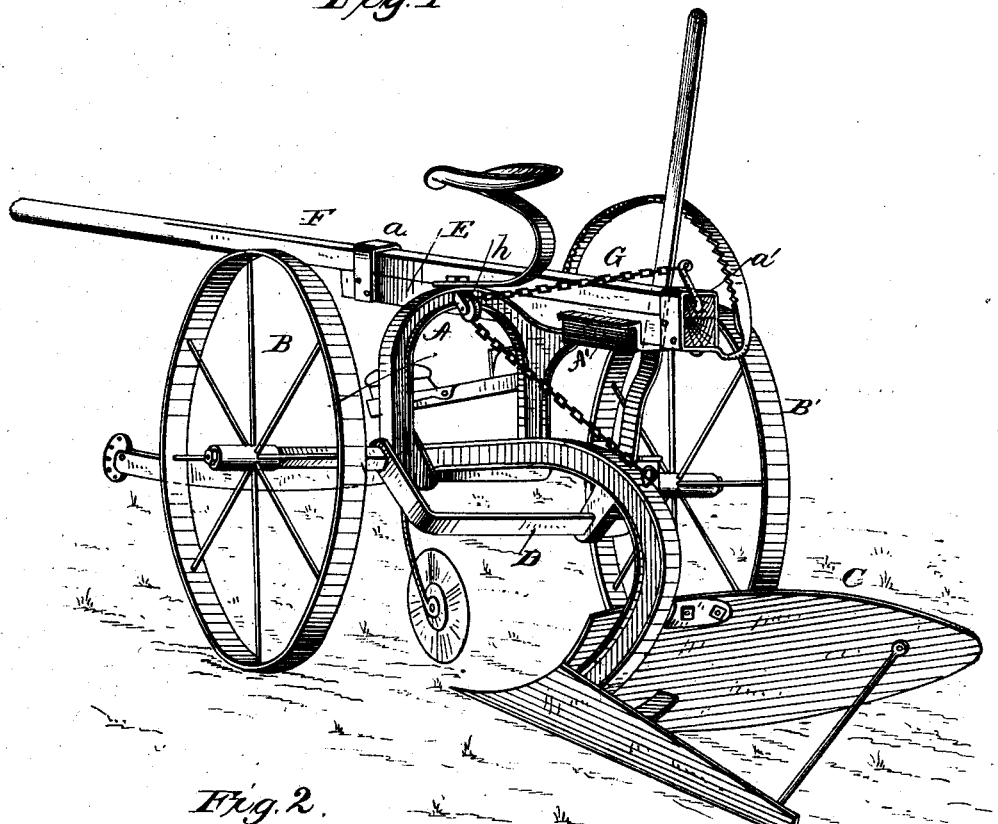
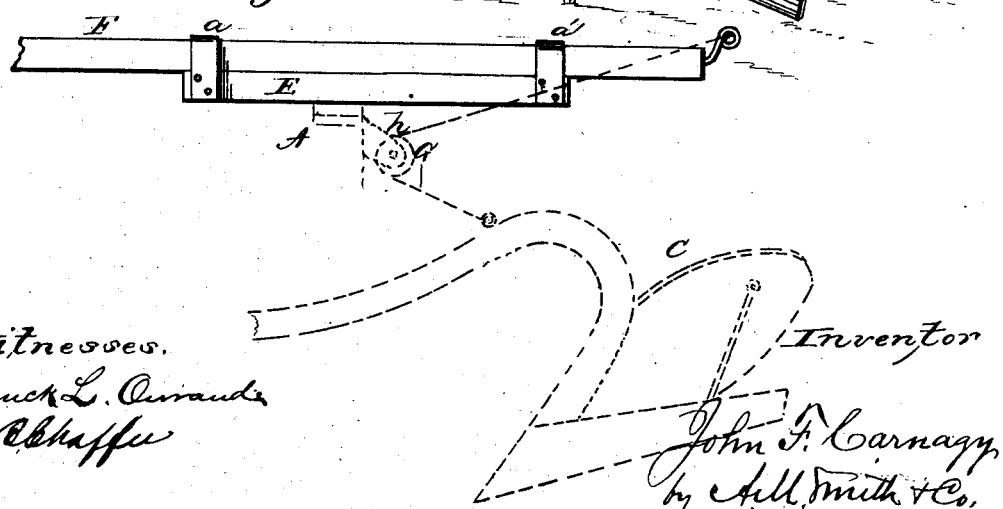
Witnesses:
Franck L. Ourand
W. C. Chaffee
Inventor
John F. Carnagy
by A. H. Smith & Co.
Attorneys
N. PETERS, Photo-Lithographer, Washington, D. C.

UNITED STATES PATENT OFFICE.

JOHN F. CARNAGY, OF COVINGTON, INDIANA.

SULKY OR WHEEL PLOW.

SPECIFICATION forming part of Letters Patent No. 244,852, dated July 26, 1881.

Application filed June 1, 1881. (No model.)

*To all whom it may concern:*

Be it known that I, JOHN F. CARNAGY, of Covington, county of Fountain, State of Indiana, have invented certain new and useful Improvements in Sulky or Wheel Plows, of which the following is a full and exact description, reference being had to the accompanying drawings, making part of this specification, in which—

Figure 1 is a perspective view of a sulky-plow with my improvements applied, and Fig. 2 is a longitudinal section through the same.

My improvement relates to a novel construction adapting the power of the team to be applied directly to the freeing the plow from obstructions in its path—such as stumps, heavy stones, &c.; and it consists in providing the wheel-carriage with a telescopic or sliding tongue, to the sliding part of which the plow is connected by a chain or other suitable flexible connection, in such manner that when the team is backed to free the plow from an obstruction the sliding tongue acts directly upon the plow to swing it clear of the obstruction, instead of indirectly through the carriage, as hereinafter explained.

The plow, with its attachments to the carriage, as also the latter with the usual means for raising and controlling the plow or plows, may be of any usual or preferred construction and arrangement, and these need not, therefore, be described in detail, further than is necessary to an understanding of my improvement.

In the accompanying drawings, A represents the main or tongue frame, mounted upon carrying-wheels B B', and with which the plow C is connected, through swinging bail or U-shaped arm D, in any usual or preferred manner. The frame A is provided with a socket, A', for the reception of a tongue-bar, E, to which, through suitable guiding-loops, *a a'*, the sliding tongue F is connected, the arrangement being such as to permit the tongue to slide longitudinally in the loops or brackets, limited in its movements by suitable stops on the tongue in front and in rear of said guiding-loops; or, if preferred, the socket A' in the frame itself may be made to permit the sliding movement of the tongue referred to, while holding it rigid in other directions, thereby dispensing with the bar E. The rear end of this sliding tongue has a chain, G, or a stout cord of wire or other suitable material connected with it, and extending thence forward over a sheave or pulley, *h*, connected with the arch or arbor of the frame, or it may be with the tongue-bar E or other suitable point, the cord or chain passing thence down to the plow or plow-beam, at or near its connection with the swinging bail, where it is secured through an eye, or in any suitable manner. By this arrangement or manner of connecting the sliding tongue with the plow it will be seen that while the plow is being drawn forward the cord or chain will be sufficiently slack to allow the plow to operate in the usual manner; but if the point of the plow should become caught by a stump or other obstruction which it cannot remove, and it becomes necessary to back the plow in order to free it therefrom, the moment the team is backed the tongue slides backward in its connections with the wheel-carriage frame without backing the latter, and acting through the cord or chain G swings the plow backward and upward away from the obstruction, freeing it therefrom, when the stop or limitation to the backward movement of the tongue taking effect, the carriage may be backed, as in the ordinary wheel-plow.

It will be apparent that the manner of connecting the sliding tongue with the frame, or, in other words, of giving it a telescopic form or action, may be varied; also, that my improvement may be applied to various constructions of wheel-plows, cultivators, and other agricultural implements analogous thereto, now in use, and I therefore do not wish to be confined to the specific arrangement shown and described, so long as the feature of the sliding tongue adapting the power of the team to be applied directly to the freeing of the implement from obstructions without the intervention of the wheel-carriage with which it is connected, substantially as described, is retained.

Having now described my invention, I claim—

1. In a wheel-plow, the combination, with the plow, of the sliding pole or tongue, and means adapting the backward sliding movement of said tongue to lift the plow free from obstructions or out of the ground.

2. The combination, in a wheel-plow or its equivalent, of the sliding pole or tongue, the plow having a hinged connection with the frame, and the cord or chain connecting said plow and tongue, arranged to lift the plow when the tongue is backed, substantially as described.

3. The combination, with the frame of a wheel-plow or its equivalent, of the fixed pole-beam E, sliding pole F, and cord or chain G, arranged and operating substantially as described, whereby the backward movement of the tongue is made to lift the plow free from an obstruction.

J. F. CARNAGY.

Witnesses:
HARVEY BARKLEY,
WILLIAM McCARTY, Jr.